United States Patent [19]
Zakharov et al.

[11] Patent Number: 6,119,640
[45] Date of Patent: Sep. 19, 2000

[54] INTERNAL COMBUSTION ENGINE WITH SLOT-TYPE GAS DISTRIBUTION

[76] Inventors: Evgeny Nikolaevich Zakharov, kv.127, d.15, korp. 3, ul. Starobitsevskaya, Moscow, 113628; Genya Tyo, kv.4, d.14, per. Ogorodnaya Sloboda, Moscow, 101000, both of Russian Federation

[21] Appl. No.: 09/234,207

[22] Filed: Jan. 20, 1999

Related U.S. Application Data

[63] Continuation-in-part of application No. PCT/RU97/00234, Jul. 21, 1997.

[51] Int. Cl.⁷ ........................................................ F01L 7/12
[52] U.S. Cl. ........................................ 123/54.2; 123/65 V
[58] Field of Search .................................... 123/54.1, 54.2, 123/65 V, 73 AE, 73 D, 73 PP

[56] References Cited

U.S. PATENT DOCUMENTS

| | | | |
|---|---|---|---|
| 1,867,682 | 7/1932 | Sperry | 123/65 V |
| 3,517,651 | 6/1970 | Graybill | 123/54.2 |
| 5,081,961 | 1/1992 | Paul et al. | 123/65 V |
| 5,261,359 | 11/1993 | Hull | 123/65 V |
| 5,365,899 | 11/1994 | Doragrip | 123/192.2 |

FOREIGN PATENT DOCUMENTS

| | | | |
|---|---|---|---|
| 79918 | 12/1950 | Czechoslovakia | 123/73 D |
| 3635873 | 5/1988 | Germany . | |
| 40 39 726 A1 | 5/1991 | Germany . | |
| 4039726A1 | 5/1991 | Germany . | |
| 4028757A1 | 8/1991 | Germany . | |
| 58-65951 | 4/1983 | Japan | 123/193.6 |
| 2037629 | 6/1995 | Russian Federation . | |
| 56419 | of 0000 | U.S.S.R. . | |
| 383852 | 8/1973 | U.S.S.R. . | |
| 1495453 | 7/1989 | U.S.S.R. . | |
| 92/12332 | 7/1992 | WIPO . | |
| WO 92/12332 | 7/1992 | WIPO . | |

*Primary Examiner*—Marguerite McMahon
*Attorney, Agent, or Firm*—Graybeal Jackson Haley LLP

[57] ABSTRACT

The present invention pertains to the field of engine construction and relates to internal combustion engines with scavenging and more precisely to two-stroke engines. At the beginning of the exhaust stroke, the exhaust gases are expelled from the engine cylinder through inlet and outlet ports, inlet and outlet passages and slide valves into an exhaust pipe. Scavenging ports are then uncovered by an upper edge of the piston and used to feed a fresh charge into the cylinder from the crank chamber while the cylinder cavity is scavenged. After expelling the exhaust gases from the cylinder cavity, the slide valves rotate to interrupt the communication between the cylinder cavity and exhaust manifold. Upon further rotation of the slide valves, the cylinder cavity is connected with the inlet pipe through the same gas-distribution organs used for the exhaust gas outlet, i.e. the inlet and outlet ports, the inlet and outlet passages and the slide valves. A fresh charge can thus be fed into the cylinder through all the ports it comprises, whereby the cylinder of a two-strike engine may be charged without any losses in the charges and with the appropriate preliminary compression ratio.

22 Claims, 12 Drawing Sheets

INTERNAL COMBUSTION ENGINE WITH SLOT-TYPE GAS DISTRIBUTION

This is a continuation-in-part of co-pending International Application PCT/RU97/00234 filed on Jul. 21, 1997 designating the United States.

FIELD OF THE INVENTION

The present invention relates to mechanical engineering, particularly, to engine designs, and, more particularly, to internal combustion engines, preferably of the two-stroke type with slot-type gas distribution.

BACKGROUND OF THE INVENTION

Described in DE, A1, 3635873 is a two-stroke internal combustion engine with slot-type gas distribution and crankcase scavenging, comprising a crankcase with a single-throw shaft installed therein, and cylinders connected to the crankcase, each of the cylinders enclosing a piston with a pin connected to the shaft through a connecting rod, and each of the cylinders having exhaust ports communicating with an exhaust pipe, and scavenging ports communicating with a crank chamber through scavenging ports.

The problems with the prior art engine include its low fuel efficiency due to the fact that a fresh charge is emitted from the cylinder into the exhaust pipe during scavenging, and the overheating of exhaust port edges, the piston and the other working surfaces. These reasons prevent tuning the engine for the average efficient pressure.

Another conventional two-stroke engine with a slot-type scavenging comprises a crankcase with a single-throw shaft installed therein, and a cylinder connected to the crankcase and enclosing a piston with a pin connected to the shaft through a connecting rod, the cylinder having a scavenging port in communication with an inlet pipe, and an inlet/outlet port connected to an inlet/outlet passage, and a slide valve mounted within the inlet/outlet passage so that alternatively connect the passage with the inlet pipe and the exhaust pipe (SU, A1, 56419).

The above prior art overcomes many of the problems inherent in the operation process of the two-stroke engines, in particular: as compared to the previously mentioned prior art, the fresh charge emission from the cylinder during the scavenging is notably reduced owing to sealing the inlet/outlet passage by the slide valve; the cylinder charging is increased; and the temperature stress on the edges of the inlet/outlet port and a portion of the piston surface is reduced owing to cooling by fresh charge admitted through the slide valve, the inlet/outlet passage and the inlet/outlet port. However, the prior art engine fails to take full advantage of the significant prospects of improving the time-to-section of the inlet and exhaust parts.

US, A1, 5081961 (FIGS. 4.1–4.5) describes an internal combustion engine with slot-type gas distribution, comprising a crankcase with a single-throw shaft installed therein, a cylinder connected to the crankcase and enclosing a piston with a pin connected to the shaft through a connecting rod, the cylinder having two opposite inlet/outlet ports, each of the ports being connected with one of inlet/outlet passages, and each of the inlet/outlet passages having a rotary valve adapted to alternately connect the passage with an inlet and outlet pipes.

As compared to SU, A1,6419, this prior art engine provides the increased time-to-section ratio owing to the doubled number of slide valves, however, it fails to take full advantage of the possibility of increasing the time-to-section ratio; the variable volume of the crank chamber is not used as a receiver, and the compression chamber is not used for cooling and lubrication of the conversion mechanism in order to enhance the reliability of the engine firing and to cool the piston and the cylinder wall by a fresh charge. Taken together, the factors above prohibit the attainment of the highest specific characteristics in the piston engines.

SUMMARY OF THE INVENTION

It is an object of the present invention to provide an engine having improved specific parameters and enhanced reliability.

The object of the invention is accomplished in an internal combustion engine with slot-type gas distribution, comprising a crankcase with a single-throw shaft installed therein, at least one cylinder connected to the crankcase and enclosing a piston with a pin connected to the shaft through a connecting rod, the cylinder having at least a pair of opposite inlet/outlet ports, each of the ports being connected with one of inlet/outlet passages, a slide valve mounted within each of the inlet/outlet passages so that to alternatively connect the passage with an inlet pipe and an exhaust pipe, wherein in accordance with the invention said slides are disposed at the opposite ends of the shaft, the cylinder has scavenging ports, and the crankcase defines a crank chamber communicating with the scavenging ports through scavenging passages and connected to the inlet pipe through the slide valve, the inlet/outlet passage and the inlet/outlet port uncovered by the lower edge of the piston as it ascends towards the top dead centre.

Each of the slide valves may be disposed in a cylindrical cavity and include a disk separator coaxial with the shaft and having a sealing over its radial surface, and a sector member disposed at an end face of the separator and contacting an end face of the crankcase, wherein said slide valve is mounted within the cavity so that to form an inlet receiver and an exhaust manifold that are connected with the inlet pipe and the exhaust pipe, respectively, said slide valve having an exhaust passage in the region of the sector member, and each of the inlet/outlet passages being made in the end face of the crankcase to periodically communicate with the exhaust manifold through the exhaust passage.

The sector member may be made in the form of a counter weight.

The piston pin may include a central cylindrical portion and cylindrical segments connected to opposite end faces of the central cylindrical portion and mating segment recesses made in the inner surface of the piston, the cylindrical segments being connected to the piston by threaded members.

The piston may be provided with guide rollers which are mounted on shafts in the piston symmetrically about the longitudinal axis of the pin, so that to contact the cylinder inner surface which defines races for the rollers.

A pair of the rollers may be mounted on each side of the piston.

The scavenging ports may be made at two sides of each of the races.

The crank chamber may be defined by an inner surface of a cylindrical groove in the crankcase, said groove being coaxial to the shaft and communicating through a bypass passage with an under-piston cavity defined by inner surfaces of the cylinder and the piston.

The bypass passage of the under-piston cavity may be provided in the rocking plane of the connecting rod, while a part of the pin central cylindrical portion is arranged within the crank chamber when the piston is in the region of the bottom dead centre.

Parts of the rollers may be received in the bypass passage when the piston is in the region of the bottom dead centre.

The single-throw shaft may include two disk-shaped webs and a crank pin which is connected to the webs eccentrically about the shaft rotation axis, rolling bearings being mounted on the external surfaces of the webs and located within the cylindrical groove in the crankcase, and a bearing bush of a lower head of the connecting rod being arranged between the webs on the crank pin.

The crank chamber may be provided with disk seals disposed within the crankcase cylindrical groove in the plane perpendicular to the shaft rotation axis, said seals being secured on the crank pin.

The seal may include a slit spring collar contacting an inner surface of the cylindrical groove, and two disk membranes mounted with an axial gap relative to the spring collar at two sides thereof and fixed on the crank pin, the membranes having an external diameter lesser than the diameter of the cylindrical groove and greater than the internal diameter of the spring collar.

A disk spacer may be secured on the crank pin between the membranes, the spacer having a width greater than the width of the spring collar.

Joint nuts may be screwed on the both ends of the crank pin.

The engine may be a multicylinder engine, wherein the bushes of the bearing of the lower heads of the connecting rods are sequentially mounted on the crank pin.

The axes of the cylinders may be disposed radially to the shaft rotation axis.

The engine may comprise a charger connected to the inlet pipe, the crank chamber being in permanent communication with the under-piston cavities in each of the cylinders.

The seals may be mounted at both sides of the bearing bush of the lower head of each of the connecting rods so as to define a variable volume chamber between each pair of the seals, communicating with the under-piston cavity of one of the cylinders through the bypass passage.

The shaft may be provided with an intermediate support having a eccentric opening in which the crank pin is located, an additional rolling bearing being mounted on the support and disposed in the cylindrical groove in the crankcase.

The inlet and outlet pipes may be made in the form of pipe branches arranged between the cylinders in parallel with the shaft rotation axis.

The pipe branches of the inlet pipe may communicate with the inlet receivers through radial channels made in the crankcase.

DESCRIPTION OF THE PREFERRED EMBODIMENT

Referring to the drawings, an engine in accordance with the present invention comprises a crankcase 1 defining a crank chamber 2, a single-throw shaft 3, a cylinder 4 enclosing a piston 5 with a pin 6 connected to the shaft 3 through a connecting rod 7, and slide valves 8 mounted at the opposite ends of the shaft 3. The cylinder 4 has scavenging ports 9 in communication with the crank chamber 2 via scavenging passages 10, and inlet/outlet ports 11 connected with an inlet/outlet passages 12. Mounted within each of the inlet/outlet passages 12 is the slide valve 8 adapted to alternately connect the passages 12 with an inlet pipe 13 and an exhaust pipe 14, and connect the crank chamber 2 with the inlet pipe 13 through passages 12 and ports 11 uncovered by a lower edge of the piston 5 as it ascends towards the top dead centre.

Each of the slide valves 8 is located within a cylindrical cavity 15 and includes a disk separator 16 coaxial to the shaft 3 and having a sealing 17 over its radial surface, and a sector member 18 disposed at an end face of the separator 16 and contacting the end face of the crankcase 1. The slide valve 8 is mounted within the cavity 15 so that to form an inlet receiver 19 and an exhaust manifold 20 connected with the inlet pipe 13 and the exhaust pipe 14, respectively. In the region of the sector member 18, the slide valve 8 has an exhaust passage 21, while each of the inlet/outlet passages 11 is arranged in the end face of the crankcase 1 so that to periodically communicate with the exhaust manifold 20 via the exhaust passage 21. The sector member 18 may be made in the form of a counter weight.

Figure 7:
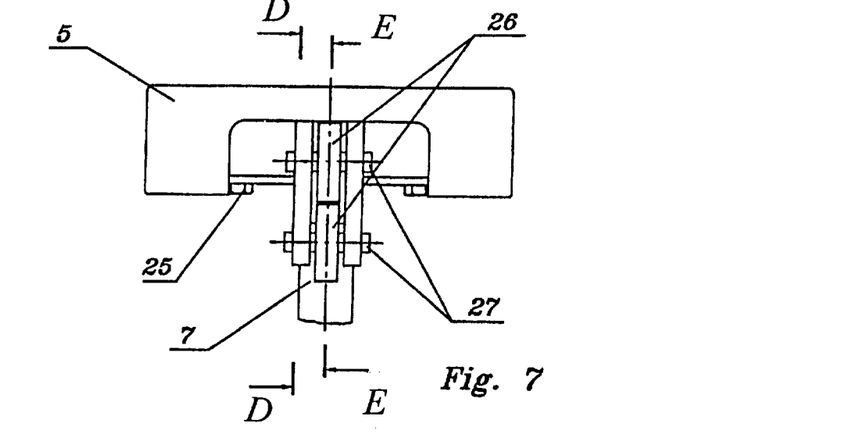
FIG. 7 is an illustration of an embodiment of a piston and a piston pin.
Figure 8:
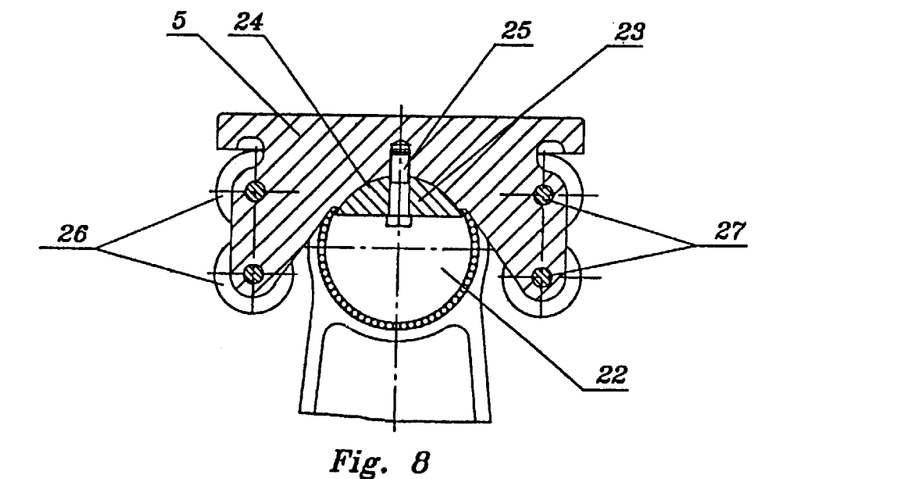
FIG. 8 is a sectional view taken through line D—D of FIG. 7.
Figure 9:
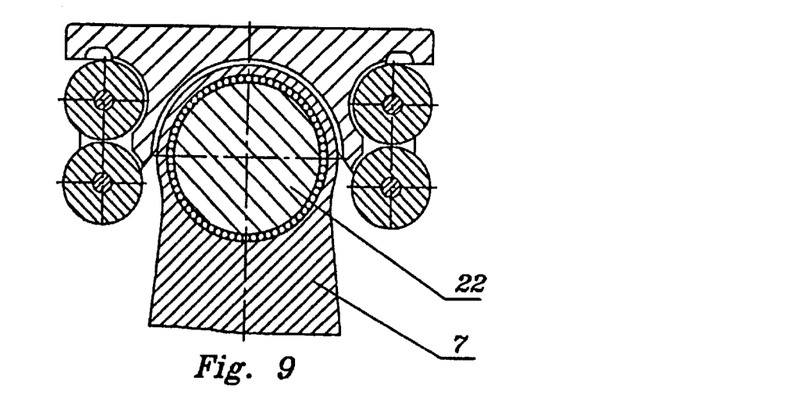
FIG. 9 is a sectional view taken through line E—E of FIG. 7.

The piston pin 6 may include a central cylindrical portion 22 and cylindrical segments 23 that are connected to the opposite end faces of the portion 22 and mate segment recesses 24 which are provided in the inner surface of the piston 5, the segments 23 being connected to the piston 5 through threaded members 25.

The piston 5 may be provided with guiding rollers 26 which are mounted on shafts 27 in the piston symmetrically over the longitudinal axis of the pin 6 so that to contact the cylinder 4 inner surface which defines races 28 for the rollers 26. A pair of the rollers 28 may be mounted on each side, and the scavenging ports 9 are arranged at two sides of each of the races 28.

The crank chamber 2 may be defined by the inner surface of a cylindrical groove 29 provided in the crankcase 1, the cylindrical groove 29 being coaxial to the shaft 3 and communicating through a bypass passage 30 with an underpiston cavity 31 defined by inner surfaces of the cylinder 4 and the piston 5. The bypass passage 30 is arranged in the rocking plane of the connecting rod 7 and receives parts of the central portion 22 of the pin 6 and parts of rollers 26 when the piston 5 is in the region of the bottom dead centre. A part of the portion 22 may be also arranged within the cavity defined by the cylindrical groove 29 in the crankcase 1.

The shaft 3 may include two disk-shaped webs 32 and a crank pin 33 connected to the webs eccentrically about the shaft 3 rotation axis. Rolling bearings 34 are mounted within the cylindrical groove 29 on external surfaces of the webs 32, and a bush 35 of a bearing of a lower head 36 of the connecting rod 7 is arranged between the webs 32 on the crank pin 33.

Figure 10:
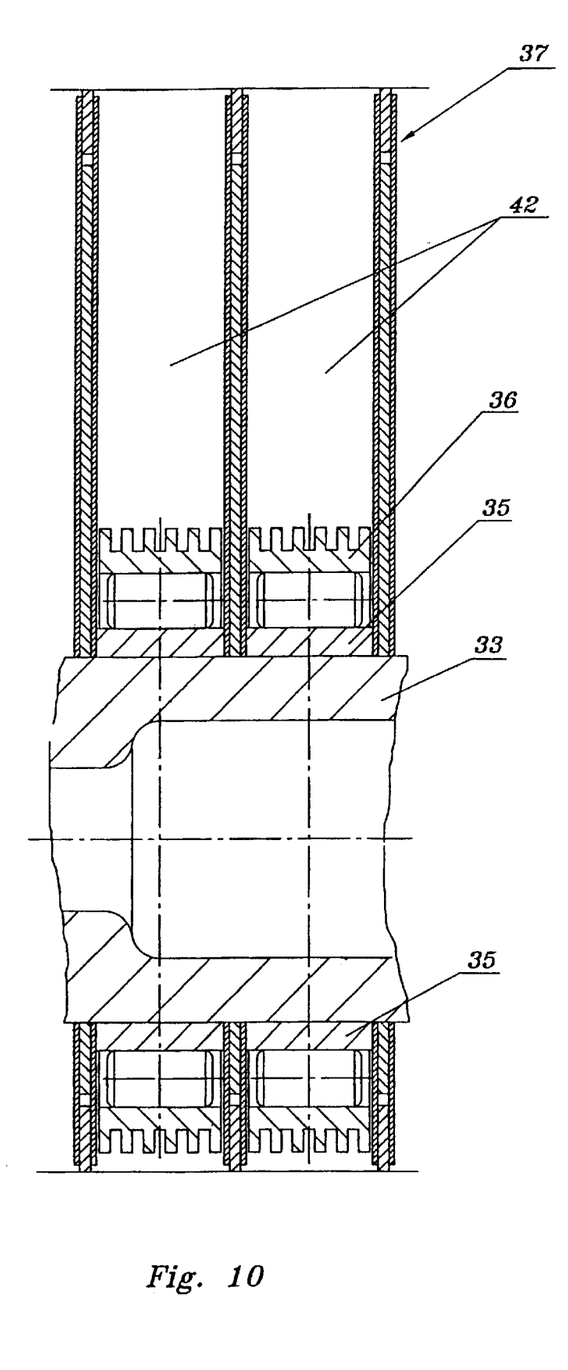
FIG. 10 is an illustration of an arrangement of the crank chamber seals.
Figure 11:
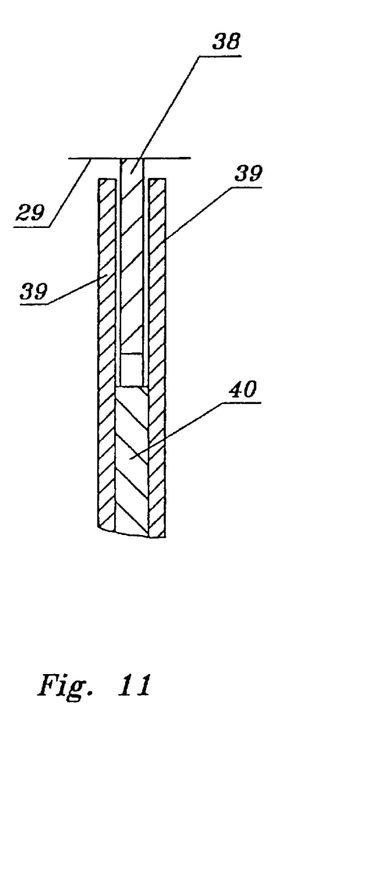
FIG. 11 is a similar view illustrating an embodiment of the seal.

The crank chamber 2 may be provided with disk seals 37 disposed within the cylindrical groove 29 in the crankcase 1 in the plane perpendicular to the shaft 3 rotation axis, and secured to the crank pin 33. The seal 37 may include a slit spring collar 38 contacting the inner surface of the cylindrical groove 29, and two disk membranes 39 disposed with an axial gap relative to the spring collar 38 at two sides thereof and fixed to the crank pin 33. The external diameter of the membranes 39 is lesser than the diameter of the cylindrical groove 29 and greater than the internal diameter of the spring collar 38. A disk spacer 40 having a width greater than that of the spring collar 38 may be secured on the crank pin 33 between the membranes 39.

Joint nuts 41 may be screwed on both ends of the crank pin 33.

The engine may be a multicylinder engine, wherein bushes 35 of the bearings of the lower heads 36 of the connecting rods 7 are sequentially mounted on the crank pin 33. The engine may comprise a charger (not shown) connected to the inlet pipe 13, the crank chamber 2 being in a permanent communication with the under-piston cavities 21 of each of the cylinders 4, or the seals 37 may be mounted at both sides of the bush 35 of the bearing of each connecting rod 7 so that to define between each pair of the seals 37 a variable volume chamber 42 in communication with the under-piston cavity 31 of one of the cylinders through the bypass passage 30.

The axes of the cylinders 4 may be disposed radially to the shaft 3 rotation axis, i.e. in the star-shape arrangement if their number is more than two.

The shaft 3 may be provided with an intermediate support 43 having an eccentric opening 44 within which the crank pin 33 is located. A supplementary rolling bearing 45 is disposed on the support 43 within the cylindrical groove 29 in the crankcase 1.

The inlet 13 and outlet 14 pipes may be made in the form of branch pipes disposed between the cylinders 4 in parallel with the shaft 3 rotation axis, the branch pipes of the inlet pipe 13 being in communication with the inlet receivers 19 through radial channels 46 provided in the crankcase 1.

Figure 12:
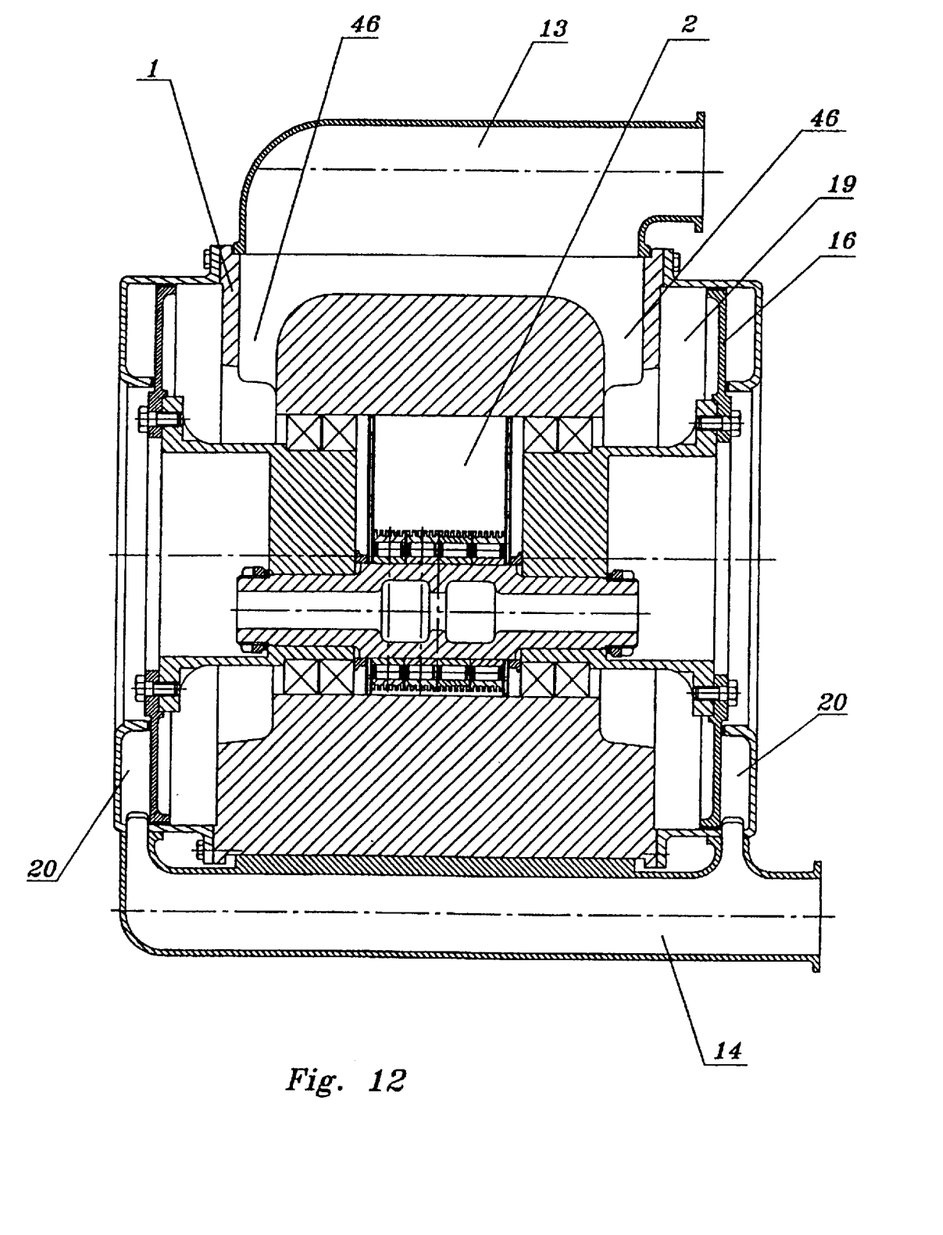
FIG. 12 is a sectional view taken through line F—F of FIG. 4.
Figure 13:
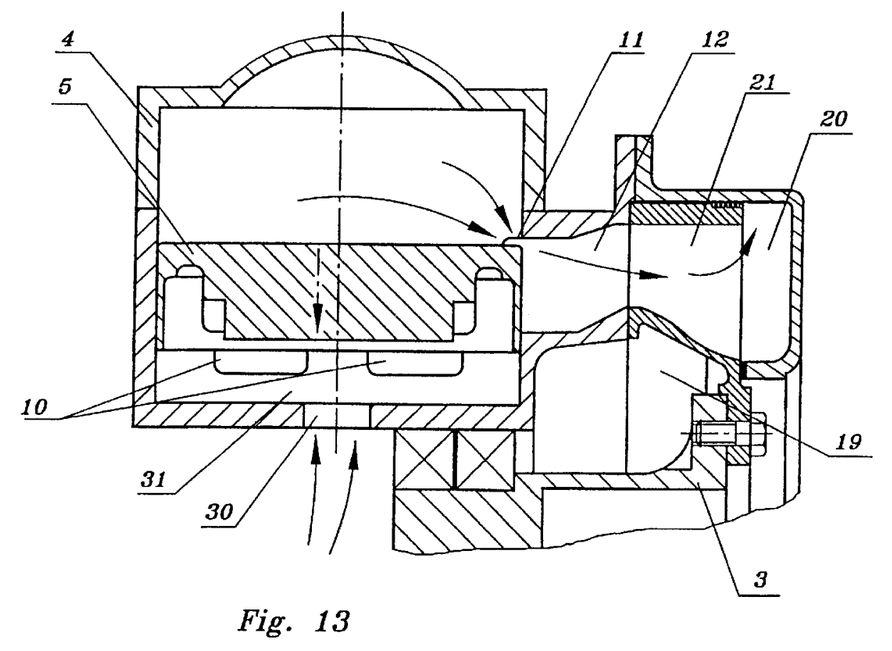
FIG. 13 illustrates the operation of the engine in accordance with invention at the instant of beginning the exhaust.
Figure 14:
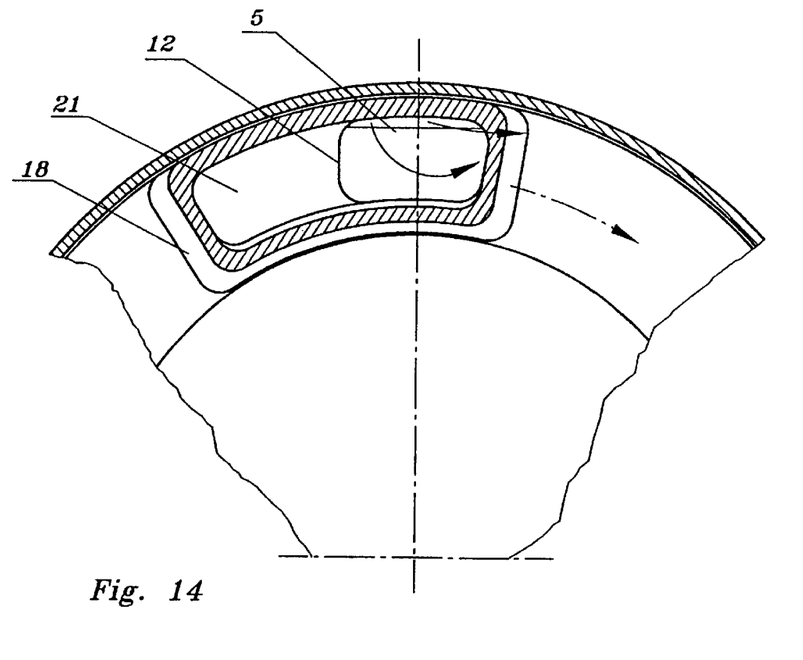
FIG. 14 is a similar view showing the slide valve position through line B—B of FIG. 2.
Figure 15:
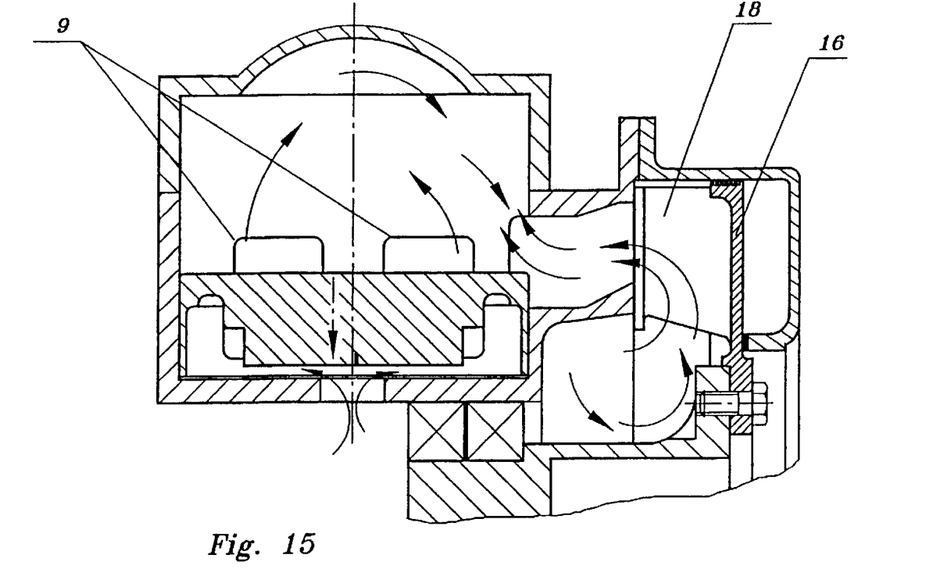
FIG. 15 illustrates the operation at the instant of scavenging and commencing the admission of a fresh charge into the cylinder.
Figure 16:
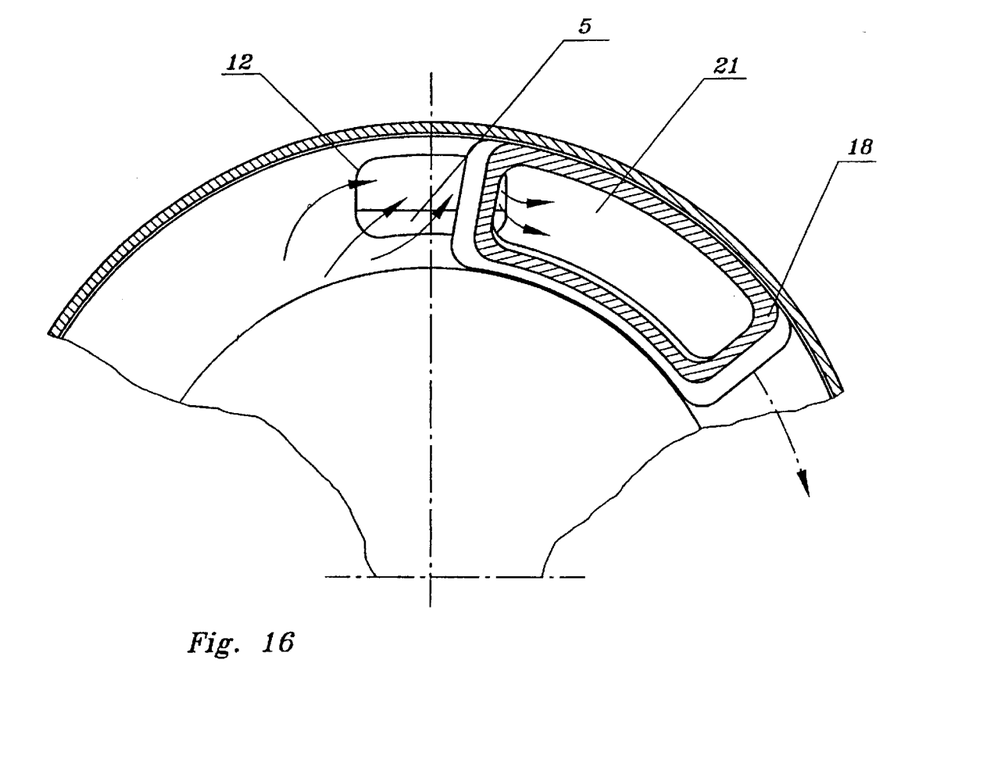
FIG. 16 is a similar view showing the slide valve position through line B—B of FIG. 2.
Figure 17:
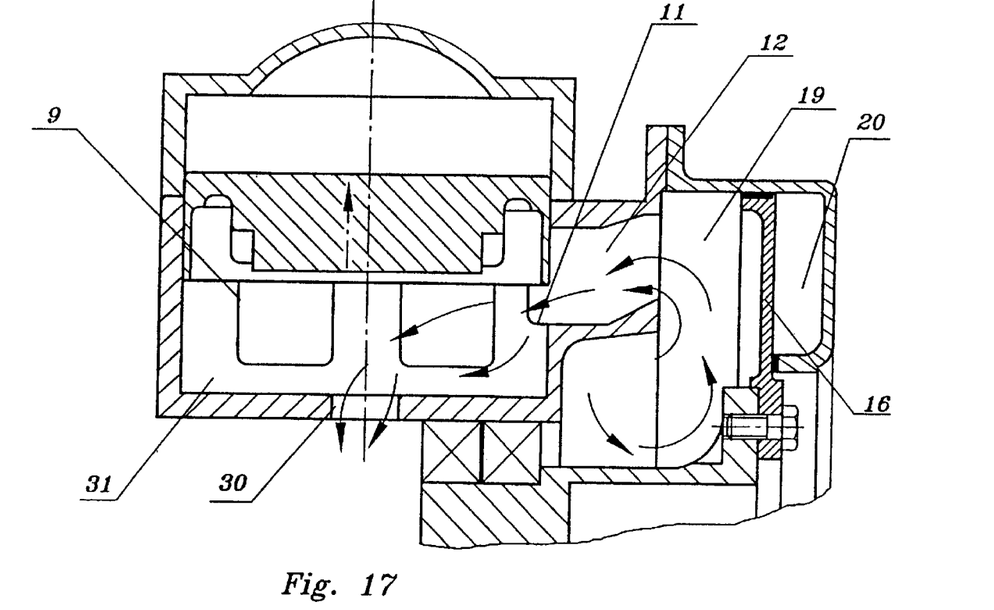
FIG. 17 illustrates the operation at the instant of compressing the charge in the cylinder and commencing the admission of the fresh charge into the crank chamber.
Figure 18:
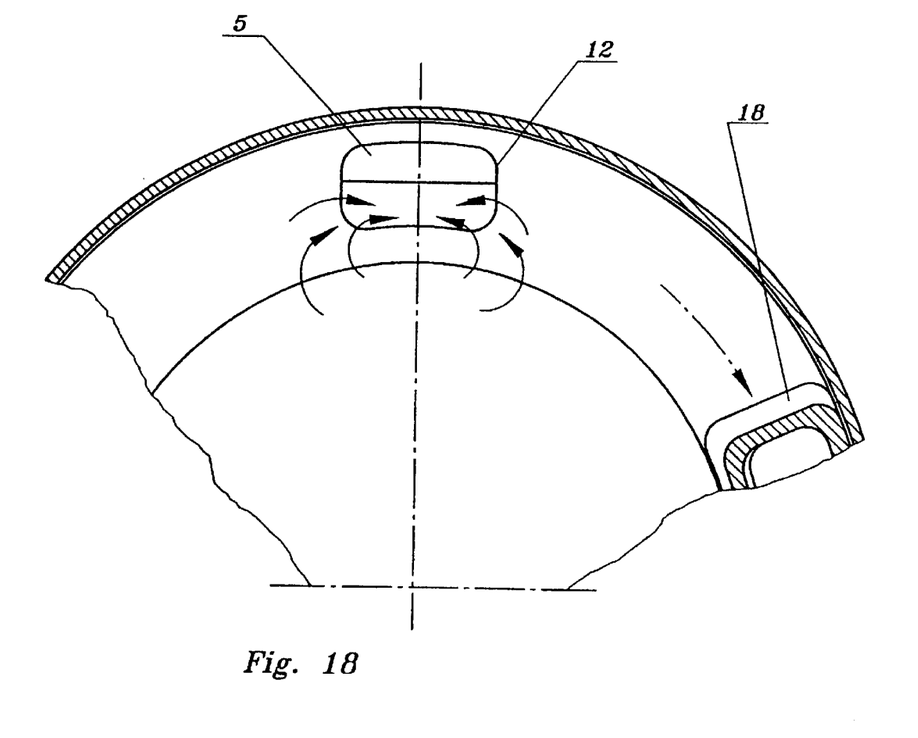
FIG. 18 is a similar view showing the slide valve position through line B—B of FIG. 2.

An engine in accordance with the present invention operates in the following manner. At the end of the expansion of combustion products in the cylinder 4, the upper edge of the piston 5 as the latter descends towards to the bottom dead centre uncovers the inlet/outlet ports 11 to commence the exhaust of spent gases from the cylinder 4 simultaneously through two inlet/outlet passages 12, the exhaust passages 21 in the slide valve 8 and the exhaust manifolds 20 into the exhaust pipe 14 (see FIGS. 12 and 13). As the piston 5 continues its motion towards the bottom dead centre, its upper edge uncovers the scavenging ports 9 to commence the admission of a compressed fresh charge into the cylinder 4 and to force out residual spent gases to the inlet/outlet ports 11, thereby scavenging the cylinder 4 cavity. At the end of the exhaust, the slide valves 8 rotate and interrupt the communication between the passages 12 and the exhaust manifolds 20 to terminate the exhaust process, and the fresh charge forced out during the scavenging from the cylinder 4 to the passages 12 either enters again the inlet pipe 13, or, depending on the slide valve design, is entrapped within the inlet/outlet passages 12, generating thereby a pressure wave directed towards the inlet/outlet ports 11 and preventing further escape of the fresh charge from the cylinder 4. Wastes of the fresh charge through the exhaust pipe 14 are thus eliminated which significantly improves the engine efficiency. It the engine comprises a charger (not shown), upon the exhaust have been finished, the admission of a compressed fresh charge into the inlet/outlet passages 12 from the inlet pipe 13 via the inlet receiver 19 commences, and the cylinder 4 is charged simultaneously through all ports (9 and 11) in the cylinder 4, enabling the appropriate forced aspiration of the two-stroke engine up to a required degree (see FIGS. 14 and 15). In this embodiment of the operation process, the time-to-section ratio of the ports 9 and 11 is several times greater than the maximum time-to-section ratio possible in four-stroke engines. The charging process continues even when the piston 5 ascends from the bottom dead centre until its upper edge sequentially covers first the scavenging ports 9 and then the inlet/outlet ports 11, whereupon the process of compressing the fresh charge in the cylinder 4 commences. As the piston 5 continues its movement from the bottom dead centre, the lower edge of the piston 5 uncovers the inlet/outlet ports 11, and a fresh charge is admitted into the crank chamber 2 from the inlet pipe 13 via an inlet receivers 19 and the passages 12 either due to negative pressure in the chamber 2 or under the pressure created by the charger (see FIGS. 16 and 17). As this takes place, the combustion products are combusted and expanded in the cylinder 4 above the piston 5, whereupon the cycle repeats.

The slide valves 8 operate as follows. The disk separator 16 of each of the slide valves 8 permanently divides the cavity 15 into the inlet receiver 19 and the exhaust manifold 20 using the radial seal 17 mating the inner cylindrical surface of the cavity 15. The sector member 18 of the slide valve 8 is in permanent contact with the end face of the crankcase 1, and the exhaust passage 21 provided in the slide valve 8 is arranged at the same radius about the rotation axis of the shaft 3 as the passage 12 provided in the end face of the crankcase 1. When the passages 21 and 12 align within a predetermined range of the rotation angle of the slide valve 8, the cylinder 4 cavity communicates with the exhaust pipe 14, and the exhaust occurs. In the absence of the communication between the passages 21 and 12, both of the inlet/outlet passages 12 are in permanent communication with the inlet pipe 13 via the inlet receivers 19 and the radial channels 46.

Thus, the task of increasing the charging of the engine cylinder 4 is solved by pre-charging the crank chamber 2 with the substantially simultaneous admission of a fresh charge into the cylinder 4 both through the scavenging ports 9 and the inlet/outlet ports 11, which ensures about the twofold increase in the inlet time-to-section ratio as compared to the most pertinent prior art (US, A1, 5981961).

The effect is also attained owing to decreased mechanical losses for driving the charger, or due to abandoning the charger at all (the use being made of the suction and compression effects in the crank chamber 2), or owing to the more even admission of the compressed charge (except the short intervals during the periods of sealing the port 11 by the side surface of the piston 5) which lowers the required increase in the charger pressure and flow rate, and, in the case of employing a centrifugal charger, improves its operation conditions in terms of gas dynamics. The fresh charge admission occurs in the substantially uninterrupted manner even in a single-cylinder engine.

The improved time-to-section ratio of an internal combustion engine makes it possible to increase the rotation frequency of its shaft without the decrease in the efficient power. This result is provided by the reduced time for charging the cylinder and the decreased hydraulic losses.

The possibility of additionally admitting a fresh charge via the crank chamber 2 provided by the operation process in accordance with the invention ensures the threefold increase in the amount of cold charge pumped through the exhaust elements. It enables all excess heat which has not managed to penetrate into the material depth to be removed from the surface of the hottest parts (edges of the ports 11, passage 12 wall and the piston 5), and, hence, improves operational parameters of the process, also owing to the increased charging of the engine cylinder, without adverse effects to its operation reliability. Additionally, the employment of the crank chamber 2 in the operation process ensures a drastic decrease in the thermal stress of the entire piston 5 not only due to fanning its walls with the cold charge through the ports 9 and 1, but also due to the intense cooling of the piston inner surface by the fresh charge admitted into the crank chamber 2 and compressed therein, and by scavenging.

The alignment between the rotation axes of the slide valve 8 and the shaft 3 permits the dimensions of the exhaust passage 21 to be best fitted to the engine gas distribution phases without substantial degradation in the weight and dimension characteristics. As to the conventional engines (References 2 and 3), the slide valve shapes and arrangement prohibit the improvement in the time-to-section ratio of the passages switched by them.

In addition, the alignment between the slide valve and shaft axes makes it possible to install a counter weight on the slide valve. The possibility of installing the counter weight at a relatively large rotation radius essentially lowers the weight being balanced, and the selected relative arrangement of the piston 5 and the sector member 18 permits the employment of the latter as the counter weight. In so doing, the removal of the counter weights from the crank chamber 2 provides the possibility of making the chamber more compact and minimizing the idle space therein. Thus, the technical approach above results in the essential improvement of the specific weight and dimension characteristics of the engine.

The provision of the piston 5 with the guiding rollers 26 contacting the races 28 in the cylinder 4 ensures, at the traditional minimum number of piston collars in two-stroke engines, the essential reduction in the mechanical losses in the cylinder and piston assembly. In addition to the solution of the direct technical task, the presence of the rollers allows the essential reduction in the height of the piston guiding part owing to the reduced stalling torque acting on the piston. As in the operation of the described engine there is no need to seal the exhaust ports by the piston lower part, the height-to-diameter ratio of the piston may be brought to $\frac{1}{3}$.

The stepped shape of the piston pin 25 with cylindrical segments 28 makes it possible, through the provision of the central portion 22 having the largest diameter and the minimum width possible, to raise the pin load capacity without increasing the weight thereof. The piston 5 can be brought as close to the shaft 3 as possible owing to the fact that the central portion 22 is received, through the bypass channel, in the cylindrical groove 29 in the crankcase 1 and the rollers 26 are partially received in the passage 30.

As the scavenging ports 9 are arranged at both sides of the races 28 for the rollers 26, the intense fanning of the latter by fresh charge at scavenging, and the admission of the fresh charge through the ports 11 obviates the problems of cooling both the rollers 26 and the cylinder-and-piston assembly as a whole.

The arrangement of the bearings 34 of the shaft 3 on the external surfaces of the webs 32 allows the supports of the shaft 3 to be ultimately brought together, providing maximum rigidity of the crank pin 33, which increases the life of the bearings of the lower head 36 of the connecting rod 7. This is the optimum design of the shaft 3 in the case of a short-stroke engine.

Figure 3:
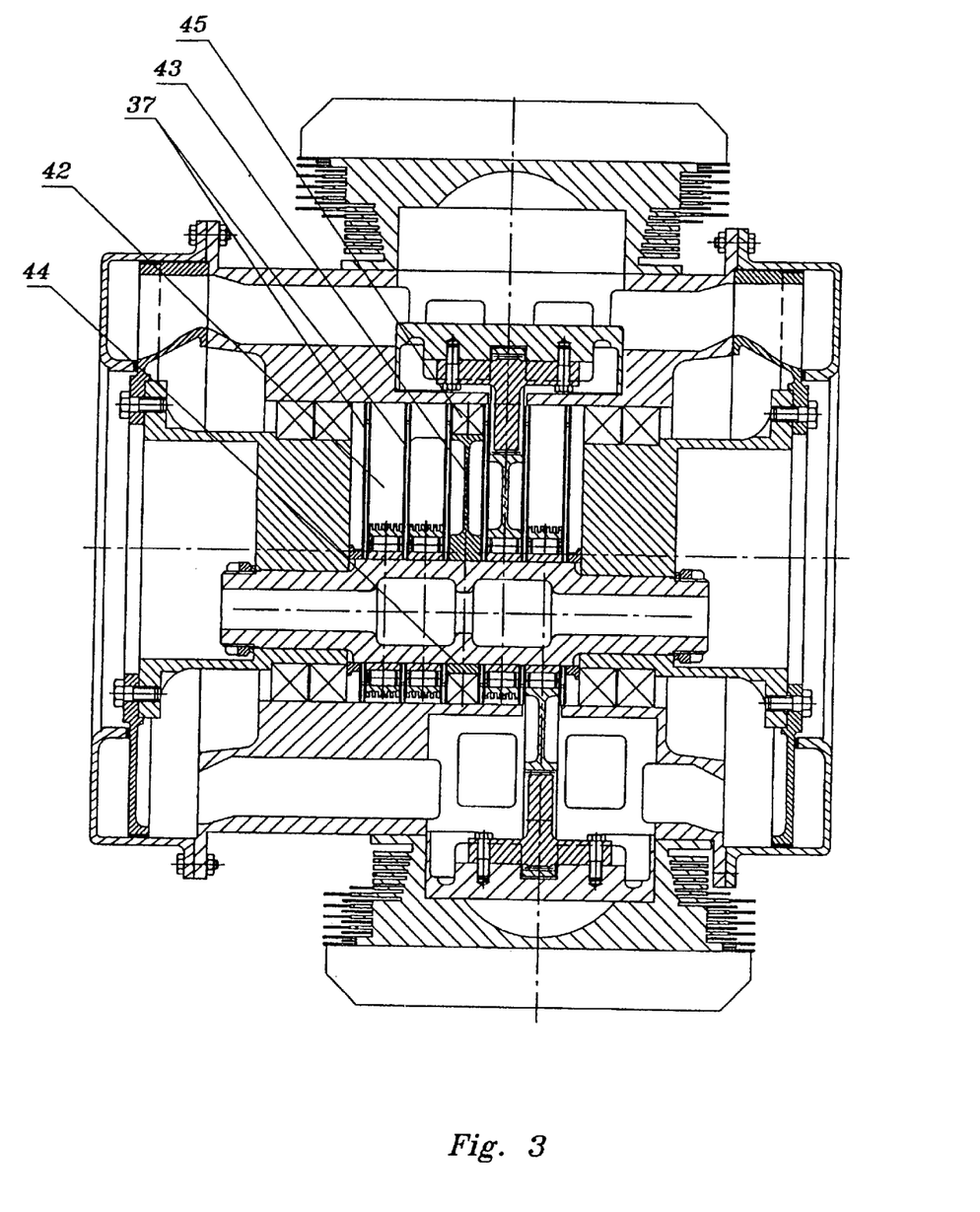
FIG. 3 is a similar view of the embodiment in accordance with claim 19.
Figure 4:
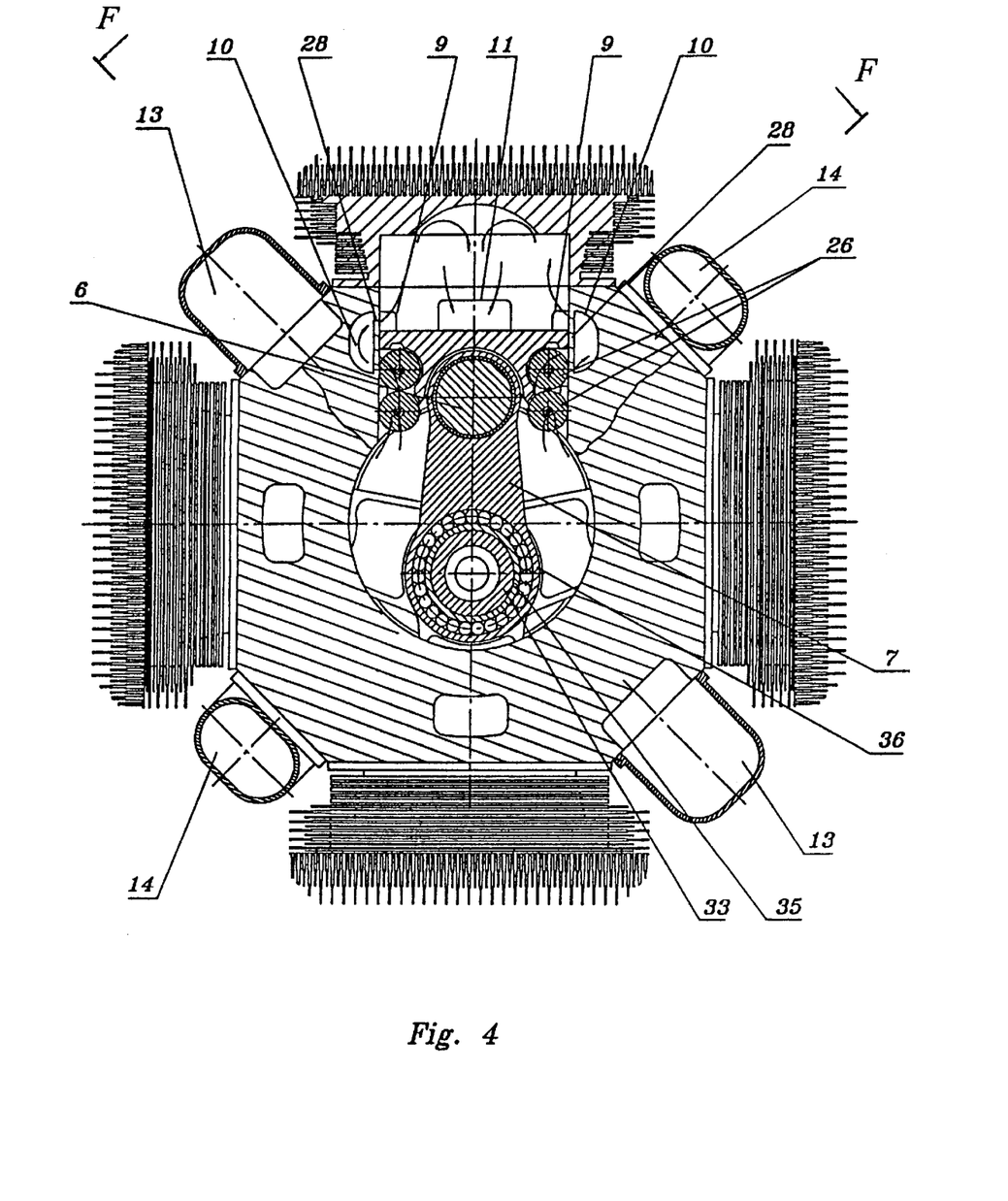
FIG. 4 is a sectional view taken through line A—A of FIG. 2.
Figure 5:
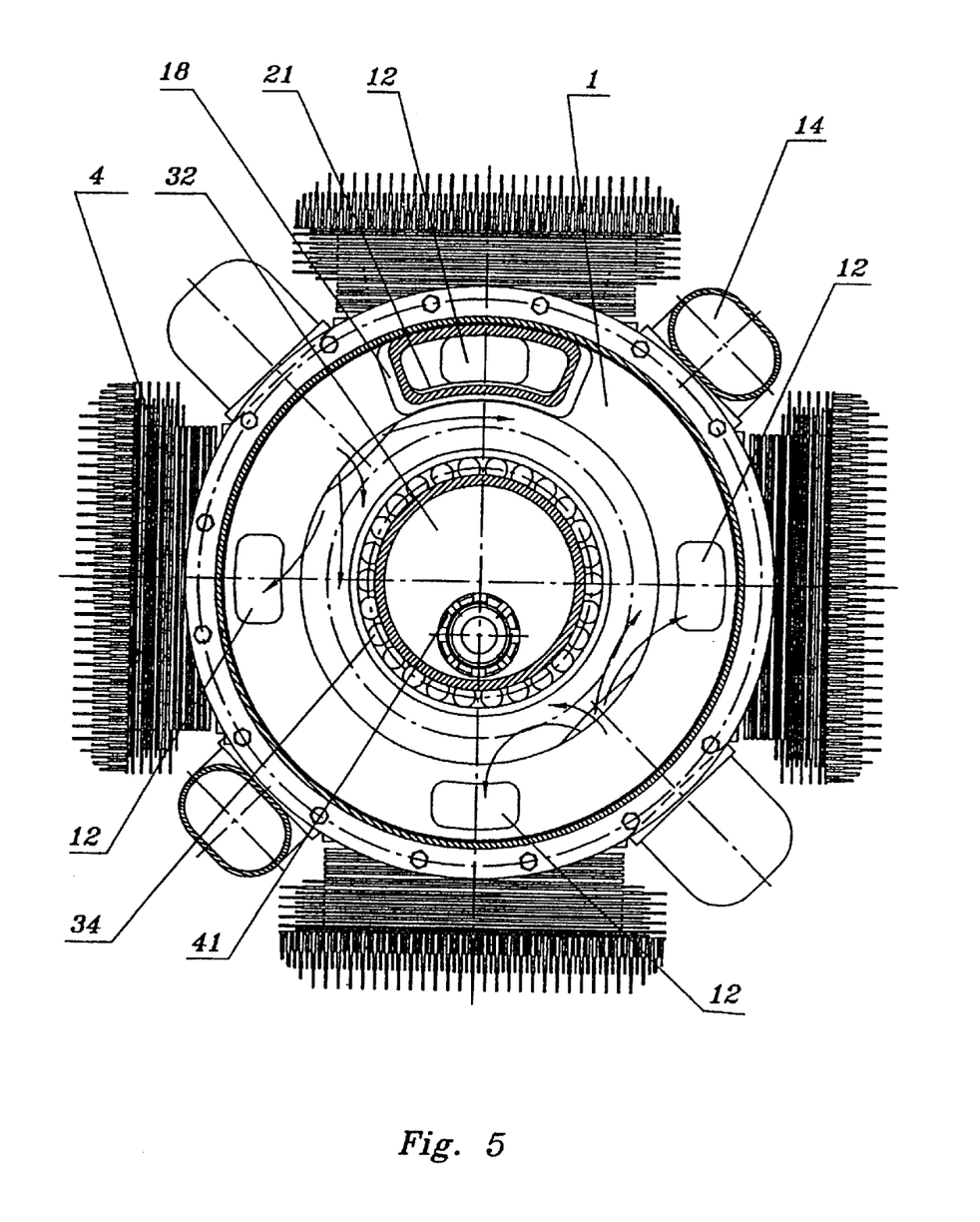
FIG. 5 is a sectional view taken through line B—B of FIG. 2.
Figure 6:
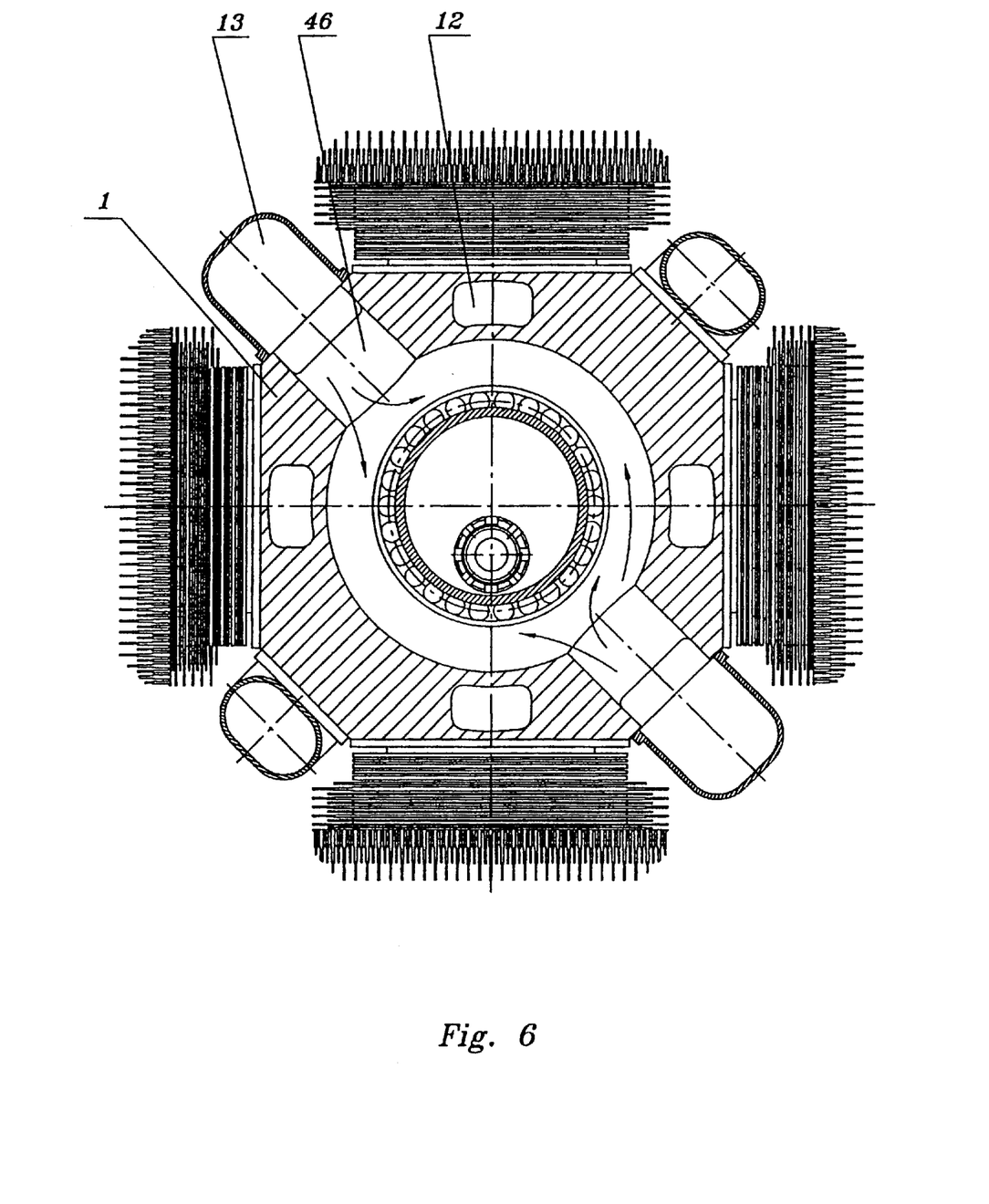
FIG. 6 is a sectional view taken through line C—C of FIG. 2.

The provision of the disk seals 37 at two sides of the bush 35 of the bearing on the lower head 36 of the connecting rod 7 eliminates the problems of sealing the crank chamber 2 and reducing its idle space, by defining an annular cavity in the chamber 42 having a width which is slightly greater than that of the connecting rod 7 (see FIG. 3). The composite form of the seals 37 makes their assembly easier and improves the air-tightness of the chamber 2. The seals operate in the following manner. Owing to its radial flexibility, the spring collar 30 is reliably fixed against cranking relative to the surface of the groove 29 in the crankcase 1. The membranes 39 and the spacer 40 in combination with the bush 35 are fixed against cranking relative to the crank pin 33, e.g. by a spline (not shown), and revolve together with the pin about the shaft 3 axis. As the membranes 39 are mounted with a gap relative to the spring collar 38, a labyrinth between them provides the sealing at minimum mechanical losses, and at the instant of the pressure increase in the chamber 42 between the seals 37 the membranes intermittently urge against the spring collar 38 and improve the air-tightness of the cavity.

Figure 1:
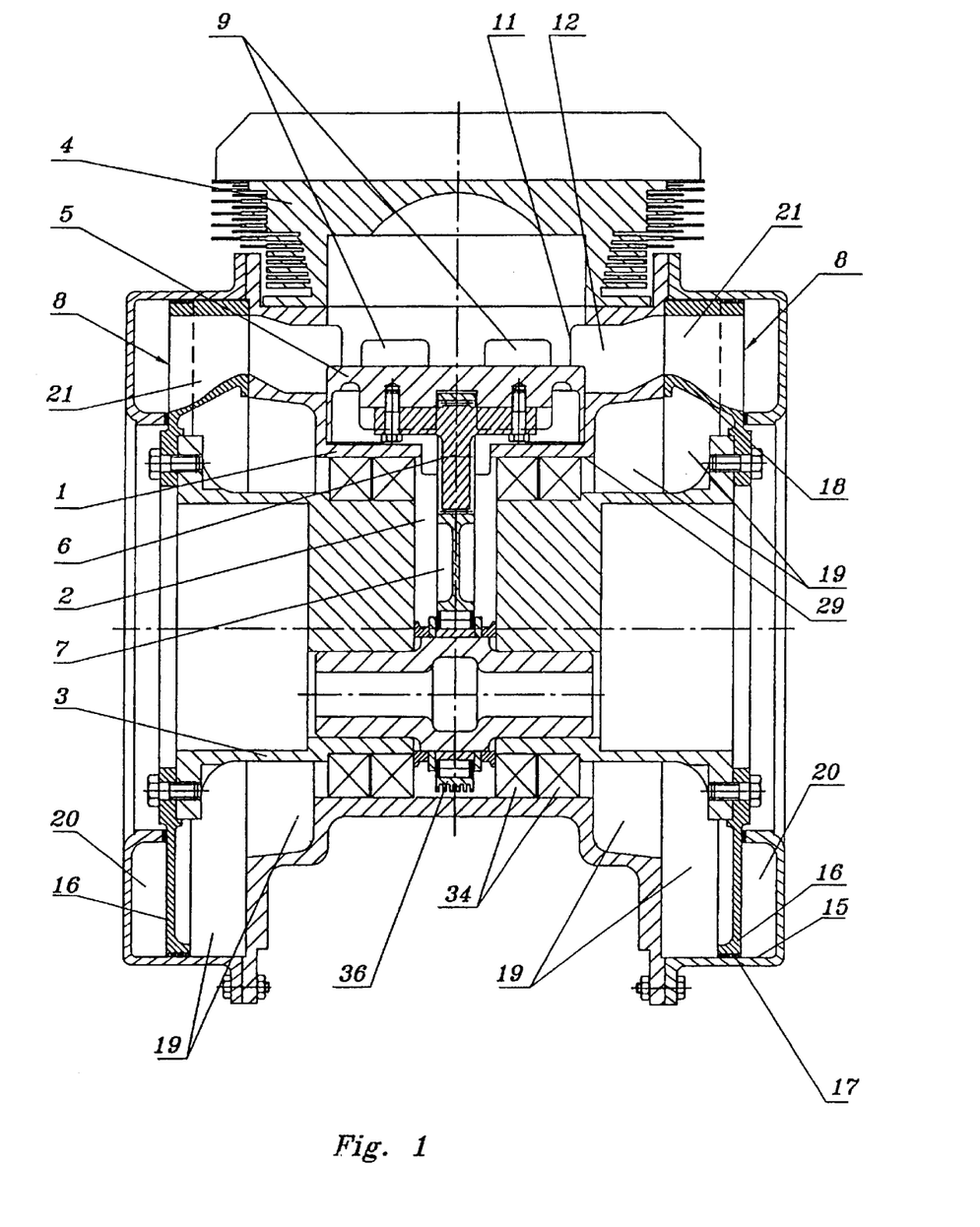
FIG. 1 is a longitudinal cross sectional view of a single-cylinder engine.
Figure 2:
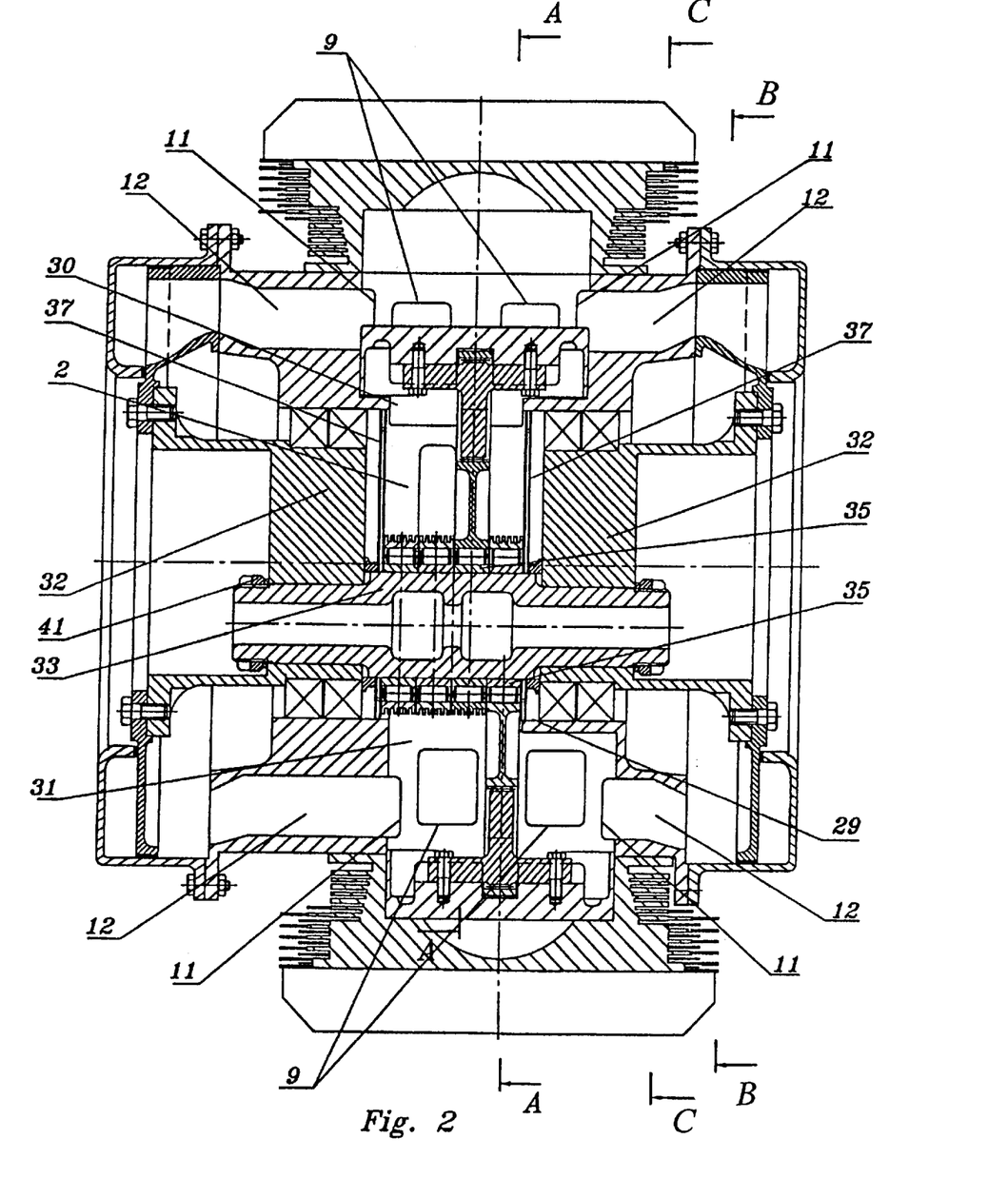
FIG. 2 is a longitudinal cross sectional view of a multi-cylinder engine in accordance with claim 18.

In a multicylinder engine, for example, with the star-shape arrangement, a fresh charge may be admitted into the crank chamber 2 under a constant pressure to cool and lubricate the crank and connecting rod mechanism. In this embodiment (see FIG. 2), the chamber 2 is employed as an additional fresh charge receiver from which, in order of the cylinder operation, the fresh charge is fed under pressure through the under-piston cavity 31, scavenging passages 10 and ports 11 to accomplish scavenging.

In another embodiment (see FIG. 3), the seals 37 are additionally installed between the bushes 35 to seal the chambers 42 each of which is in communication with one of the cylinders 4 through the bypass passage 30. It enables the fresh charge suction and compression strokes to be accomplished in each chamber 42 before scavenging the cylinder, and provides a chance of essentially enhancing the reliability of the engine starting as compared to the previous embodiment.

The provision of a supplementary support 43 contributes to rigidity of the shaft 3 in multicylinder engines and in engines tuned for an average efficient pressure, e.g. in diesels.

The arrangement of the inlet 13 and outlet 14 pipes along the shaft 3 axis between the cylinders 4 ensures the integration of each cylinder passages into a common system without the increase in the dimensions, and the attachment of the gas distribution systems of several engines when they are integrated into a multimodule structure. In addition, such arrangement of branch pipes improves the intensity of fanning the cylinder at air cooling.

Therefore, the engine in accordance with present invention overcomes the major problems encountered in designing engines, particularly:

- the efficiency of a two-stroke engine is markedly improved as compared to a four-stroke engine, since charge wastes during scavenging are eliminated through the use of slide valves, the mechanical losses being lesser in the two-stroke engine;
- the restrictions on charging the cylinders of a two-stroke engine are eliminated which allows the forced aspiration of the engine up to a required degree owing to both the provision of slide valves sealing the cylinder cavity, and the intense cooling of the engine interior, which permits the engine to be tuned for an average efficient cycle pressure without the reduction in life;
- the shaft speed range is extended as compared to the engines having a compatible working volume of one cylinder, which allows the engine to be uprated owing to both the extended gas distribution phases owing to the use of slide valves, and the short-stroke design of the engine;
- the engine life and its mechanical efficiency are increased owing to changing over the majority of sliding couples to rolling couples (except for the cylinder-and-piston collar couple);
- the engine reliability is improved owing to the extremely simple overall kinematics (especially evident in a multicylinder arrangement), the maximum rigidity of the conversion mechanism, and the considerably reduced loads in the engine with the star-shape arrangement, achieved only in the two-stroke process, which permits the mechanism in accordance with invention to be used in a two-stroke engine tuned for performance;
- the engine weight and dimension characteristics are considerably improved owing to the possibility of uprating and tuning the engine for an average efficient pressure, and to the reduced dimensions and, consequently, the weight.

Industrial Applicability

The present invention can be employed in designing and manufacturing internal combustion engines with slot-type gas distribution. An engine in accordance with the invention resolves the basic problems inherent to the engines, such as the inferior efficiency of two-stroke engines caused by great wastes of fresh charge during scavenging, and mechanical losses for driving a charger, the high thermal stress of the piston and the exhaust system components. The engine specific weight and dimension characteristics are comparable to those of gas-turbine engines, while the engine in accordance with the invention is more efficient and reliable, less expensive and has a simpler structure.

What is claimed is:

1. An internal combustion engine with a sequential operating cycle, comprising:
    a crankcase with a shaft installed therein,
    at least one cylinder connected to the crankcase and enclosing a piston with a pin linked to the shaft through a connecting rod, the cylinder having at least a pair of opposite ports, each port being connected with a passage,
    a slide valve mounted within each passage to alternatively connect the passage with an inlet pipe and an exhaust pipe,
    wherein the slide valves are disposed at opposite ends of the shaft, the cylinder has scavenging ports, and the crankcase defines a crank chamber communicating with the scavenging ports through scavenging passages and connected to the inlet pipe through the slide valve, and whereby the passage and the port are uncovered by a lower edge of the piston as the piston ascends the cylinder.

2. The engine of claim 1, wherein each slide valve is disposed within a cylindrical cavity and includes a disk separator coaxial with the shaft and has a sealing over a radial surface thereof, and a sector member is disposed at an end face of the separator and contacts an end face of the crankcase, said slide valve being mounted within the cavity so as to form an inlet receiver and an exhaust manifold that are connected with the inlet pipe and the exhaust pipe, respectively, the slide valve having an exhaust passage in the region of the sector member, and each of the passages being made in the end face of the crankcase so as to periodically communicate with the exhaust manifold through the passage.

3. The engine of claim 2, wherein said sector member is a counter weight.

4. The engine of claim 1, wherein said piston pin includes a central cylindrical portion and cylindrical segments connected to opposite end faces of the central cylindrical portion and mating segment recesses in the inner surface of the piston, the cylindrical segments being connected to the piston by threaded members.

5. The engine of claim 1, wherein said piston is provided with guide rollers which are mounted on shafts in the piston symmetrically about the longitudinal axis of the pin so that to contact the cylinder inner surface which defines races for the rollers.

6. The engine of claim 5, wherein a pair of said rollers is mounted on each side of the piston.

7. The engine of claim 6, wherein said scavenging ports are arranged at two sides of each of the races.

8. The engine of claim 1, wherein said crank chamber is defined by an inner surface of a cylindrical groove in the crankcase, said groove being coaxial with the shaft and communicating through a bypass passage with an underpiston cavity defined by inner surfaces of the cylinder and the piston.

9. The engine of one of claims 4 or 8, wherein said bypass passage is arranged in the rocking plane of the connecting rod, while a part of the pin central cylindrical portion is received in the crank chamber when the piston is in the region of the bottom dead centre.

10. The engine of one of claims 5 or 8, wherein parts of said rollers are received in the bypass passage when the piston is in the region of the bottom dead centre.

11. The engine of one of claims 1 or 8, wherein said single-throw shaft includes two disk-shaped webs and a crank pin which is connected to the webs eccentrically about the shaft rotation axis, rolling bearings being mounted on the external surfaces of the webs and located within the cylindrical groove in the crankcase, and a bush of a bearing of a lower head of the connecting rod being arranged between the webs on the crank pin.

12. The engine of claim 1, wherein said crank chamber is provided with disk seals disposed within the crankcase cylindrical groove in the plane perpendicular to the shaft rotation axis, said seals being secured on the crank pin between the bush and the webs.

13. The engine of claim 12, wherein said seal includes a slit spring collar contacting an inner surface of the cylindrical groove, and two disk membranes mounted with an axial gap relative to the spring collar at two sides thereof and fixed on the crank pin, the membranes having an external diameter lesser than the diameter of the cylindrical groove and greater than the internal diameter of the spring collar.

14. The engine of claim 13, wherein a disk spacer is secured on the crank pin between the membranes, the spacer having a width greater than the width of the spring collar.

15. The engine of one of claims 11 or 13, wherein joint nuts are screwed on the both ends of the crank pin.

16. The engine of claim 1 in the form of a multicylinder engine, wherein said bushes of the bearings of the lower heads of the connecting rods are successively mounted on the crank pin.

17. The engine of claim 16, wherein axes of the cylinders are arranged radially to the shaft rotation axis.

18. The engine of claim 16, comprising a charger connected to the inlet pipe, wherein said crank chamber is in permanent communication with the under-piston cavities in each of the cylinders.

19. The engine of one of claims 12 or 16, wherein said seals are mounted at both sides of the bush of the bearing of the lower head of each of the connecting rods so as to define a variable volume chamber between each pair of the seals, said chamber communicating with the under-piston cavity of one of the cylinders through the bypass passage.

20. The engine of claim 16, wherein said shaft is provided with an intermediate support having a eccentric opening in which the crank pin is located, an additional rolling bearing being mounted on the support and disposed in the cylindrical groove in the crankcase.

21. The engine of claim 16, wherein said inlet and outlet pipes are pipe branches arranged between the cylinders in parallel with the shaft rotation axis.

22. The engine of claim 21, wherein said pipe branches of the inlet pipe communicate with the inlet receivers through radial channels made in the crankcase.

* * * * *